Patented Aug. 13, 1940

2,211,001

UNITED STATES PATENT OFFICE 2,211,001

OXALKYL DERIVATIVES OF IMIDAZOLINES

August Chwala, Vienna, Austria, assignor, by mesne assignments, to General Aniline & Film Corporation, New York, N. Y., a corporation of Delaware No Drawing. Application March 10, 1938, Serial No. 195,118. In Austria March 18, 1937

5 Claims. (Cl. 260—309)

This invention relates to cyclic amidines and to the manufacture of such products and especially to the condensation of cyclic amidines, derived from aliphatic diamines with an alkylene oxide or a monohalogen derivative of a polyhydric alcohol.

I have found that cyclic acid amidines derived from aliphatic diamines, for instance imidazolines and tetrahydropyrimidines, and containing exchangeable hydrogen atoms, for instance, imido, amido or hydroxyl groups, may be condensed with a 1.2-alkylene oxide, such as ethylene oxide, propylene oxide, glycide, butylene oxide, cyclohexene oxide, epichlorhydrin, side chains with ether-alcohol groups being, thereby, introduced into the molecule of these amidines. The reaction may be performed, if desired, in the presence of a catalyst such as sodium hydroxide, potassium hydroxide or sodium methylate or of an acid substance, for instance sodium bisulfate at a raised temperature whereby one or several mols of the alkylene oxide may enter into reaction. Instead of the 1.2-alkylene oxide, there may also be used a monohalogen derivative of polyhydric alcohols, for instance, glycol, diglycol, polyglycol, glycerol, polyglycerol.

These compounds are caused to act upon the cyclic acid amidine at a raised temperature and, if desired, under pressure. The reaction may also be performed several times, by converting, for instance, an imidazoline containing the group —CH₂—CH₂—OH by means of metallic sodium into the sodium compound and causing the latter to react with the halogen compound of a polyhydric alcohol at a raised temperature and in the presence of an inert solvent. It is also possible to react the compounds obtainable from cyclic amidines and halogen derivatives of a polyhydric alcohol and containing one or several hydroxyl groups with alkylene oxides.

By the introduction of the ether-alcohol side chains the properties of the cyclic acid amidines may be influenced and the solubility, especially of the high-molecular compounds, may be improved which renders them considerably more useful, for instance, as textile or leather adjuvants.

The condensation products are oily to fat- or wax-like products whose solubility in water varies according to the number of the alkyleneoxy groups.

In case the reaction products are insoluble in water or are soluble in water only to a small extent they may be rendered water-soluble by reaction of their nitrogen group or free OH- groups which may also be present in the form of alkali alcholates with reactive compounds, such as sulfuric acid chlorosulfonic acid or chloroacetic acid. The subsequent reaction at the groups mentioned may also be performed in order to vary the effect of the products.

As such reactions there may be mentioned, for instance, the reaction with halogen-carboxylic acids containing a reactive halogen atom, with halogen-alkylsulfonic acids containing a reactive halogen atom, with di- or poly-basic carboxylic acids with formation of acid esters of these acids: furthermore, esterification with poly-basic inorganic acids such as, for instance, sulfuric acid or phosphoric acid. The hydroxyl group may also be esterified, for instance, with hydrochloric acid, with organic carboxylic or sulfonic acids; furthermore, by treatment with phosgene with formation of chloro-carbonic acid ester; also by the action of formaldehyde and HCl the omega-chloromethyl ethers may be obtained and these products may be subjected to further reactions, the halogen compound obtainable from a compound which contains an OH-group and in which OH has been exchanged for Cl or obtainable from the action of CH₂O and HCl may be caused to react with potassium cyanide and the reaction product may be saponified subsequently or a chlorocarbonic acid ester obtainable by treatment of a compound containing an OH-group with phosgene may be caused to react with hydroxy-alkyl-sulfonic acids, aminoalkyl-sulfonic acids, aminoaryl-sulfonic acids, aminoalkyl- or aminoaryl-carboxylic acids. The said reaction products are in part oily bodies and in part bodies of a fat- to wax- or resin-like nature; they may also be obtained as a solid pulverizable mass. Insofar as they contain hydrophilic groups, they are generally water-soluble. But there are also obtained water-insoluble products.

The new products are very suitable for use in the textile, leather and dyeing industry. They are used for washing crude textile materials as well as finished textiles from natural or artificial textile materials or for washing skins and feathers for beds. Also in the so-called dry washing process the new products may be used with a good result in combination with organic solvents. Furthermore, they are used for greasing wool, particularly in combination with a mineral oil or olein, as emulsifying and dispersing agents for all purposes in the textile and dyeing industry. They are, furthermore, very good wetting and penetrating agents.

Imidazolines and tetrahydropyrimidines the imido-group of which is not substituted may easily be caused to react with 1.2-alkylene oxides.

By introducing, for instance, ethylene oxide, at an elevated temperature into molten μ-heptadecenyl-imidazoline, the following compound is obtained:

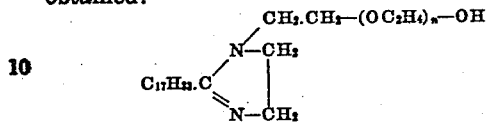

the number of (OC₂H₄)-groups depending on the amount of the ethylene oxide introduced. Lysidine reacts in the same manner.

It is also possible to react with alkylene oxides such imidazolines or tetrahydropyrimidines as contain alcoholic or phenolic hydroxyl groups or amino-radicals. μ-undecyl-N-(aminoethyl)-imidazoline:

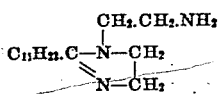

may, for instance, be caused to react with 2 mols of ethylene oxide with formation of:

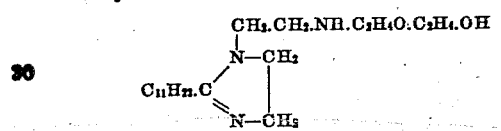

In the case of pentadecyl-N-ethyl-hydroxy-tetrahydropyrimidine:

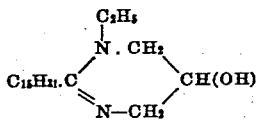

the ethylene oxide is added at the hydroxyl group. The hydroxyl groups may also be present in the carbon chain, for instance, in imidazolines which are derived from castor oil fatty acid. The above-named cyclic acid amidines may contain, besides the imino-, amino- or hydroxyl-groups, other radicals, especially sulfonic acid groups. By introducing ether-alcohol groups the sulfonic acids of high-molecular imidazolines or tetrahydropyrimidines may be rendered soluble in dilute acids in which otherwise they are hardly soluble.

Ether-alcohol groups may also be introduced into imidazolines or tetrahydropyrimidines by condensing them with monohalogen derivatives of polyhydric alcohols. The μ-undecyl-N-(dihydroxypropyl)-imidazoline:

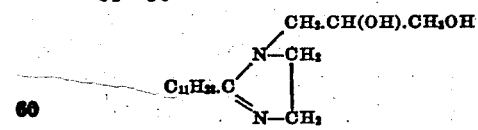

for instance, may be caused to react, while heating, with glycerol-monochlorhydrin, an ether being formed.

It is also possible to condense with imidazolines or tetrahydropyrimidines monohalogen derivatives of ether-alcohols, such as for instance, monochloro-diglycol ether,

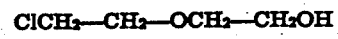

or monohalogen derivatives of polyglycerols such as may be formed by the action of hydrogen chloride upon polyglycerols.

Suitable starting materials for the present process are imidazolines and tetrahydropyrimidines of low or high molecular weight derived from mono- or poly-carboxylic acids of the aliphatic, cycloaliphatic or aromatic series. There may, for instance, be named: propyl-, butyl-, phenoxymethyl-, undecyl-heptadecenyl-imidazoline or -tetrahydropyrimidine.

The following examples serve to illustrate the invention, but they are not intended to limit it thereto; the parts are by weight:

(1) Ethylene oxide is introduced into 11.2 parts of undecylimidazoline heated to 120° C.–140° C., until the increase in weight amounts to about 2½ mols of ethylene oxide, calculated upon one mol of the base.

A light-brownish, viscous mass is obtained which easily and entirely dissolves in water to a clear solution. Its aqueous solution foams on shaking.

(2) In the manner described in Example 1, 306 parts of heptadecenyl-imidazoline are condensed with propylene oxide by introducing the latter, drop by drop, into the molten base, at a temperature of 120° C.–140° C. As soon as about 4 mols of propylene oxide—calculated upon the weight of the free base—have been adsorbed, the introduction of propylene oxide is interrupted. A brownish mass is obtained which dissolves in water to a clear solution, while strongly foaming.

(3) Heptadecyl-tetrahydropyrimidine is, in the manner described in Example 1, condensed with ethylene oxide, until the increase in weight amounts to 6 mols of ethylene oxide, calculated upon the weight of the base used. A brown, liquid mass is obtained which easily dissolves in water, while foaming.

(4) 111 parts of heptadecenyl-imidazoline are condensed with 116 parts of finely pulverized sodium gamma-chloro-beta-hydroxypropane-sulfonate of about 92 per cent. strength, by heating at 160° C.–180° C. Ethylene oxide is, at 120° C.–140° C., introduced into the melt obtained, until the increase in weight amounts to 3–5 mols of ethylene oxide, calculated upon hepta-decenyl-imidazoline-hydroxy-propane-sulfonic acid.

The product obtained dissolves in water to a clear foaming solution.

(5) 280 parts of undecylimidazoline and 111 parts of alpha-glycerol-monochlorohydrin are heated, for about 1 hour, at about 140° C.–150° C. A brownish liquid is obtained into which propylene oxide is introduced, drop by drop, according to Example 2, until the increase in weight amounts to 6–10 mols, per mol of the base used. A brownish liquid is obtained which dissolves in water to a clear solution.

(6) 112 parts of undecyl-imidazoline are condensed, by heating at 140° C.–160° C., with 118 parts of a poly-glycerol-chlorhydrin (content of chlorine: 10.3%) obtained from alpha-chlorhydrin and glycerol. The brownish liquid obtained dissolves very easily even in cold water to an entirely clear solution.

(7) 33.8 parts of hydroxy-heptodecyl-tetrahydropyrimidine (obtained from the fatty acids of hardened castor oil and trimethylene-diamine) and 13 parts of benzyl chloride are, by heating at 140° C.–160° C., converted into the N-benzyl-hydroxyheptadecyl-tetrahydropyrimidine. The product is then treated, at 120° C.–140° C., with ethylene oxide or propylene oxide, until the increase in weight amounts to 12–15 mols of alkylene oxide, per mol of the base.

(8) Phenoxy-acetic acid is, in known manner, condensed with ethylene-diamine to form the corresponding imidazoline. 100 parts of phenoxy-methylimidazoline are, at 120° C.–140° C., treated with ethylene oxide, until the increase in weight amounts to about 130–140 parts, calculated upon the weight of the imidazoline base.

A preparation is obtained which dissolves in water to a clear solution. It is also possible to treat with ethylene oxide, in the above manner, phenoxymethyl-imidazolines substituted in the aromatic nucleus, for instance ortho-chlorophenoxy-methylimidazolines. The solubility in water is the same.

(9) Ethylene oxide is, at 180° C.–200° C., introduced into 30.8 parts of molten heptadecyl-imidazoline, until the total increase amounts to 48.4 parts = 11 mols of ethylene oxide. A brown, solid mass is obtained which easily dissolves in water. Its aqueous solution strongly foams on shaking and is suitable as washing agent.

I claim:

1. Imidazolines substituted in 2-position by a radical containing from 11 to 17 carbon atoms selected from the group consisting of aliphatic hydrocarbon radicals and aliphatic hydrocarbon radicals substituted by hydroxy groups, said imidazolines containing a radical selected from the group consisting of —N—(R—O)$_n$H;  —NH—(R—O)$_n$H and —O—(R—O)$_n$H wherein R denotes an aliphatic radical and $n$ is a whole number greater than 1.

2. Imidazolines substituted in 2-position by a radical containing from 11 to 17 carbon atoms selected from the group consisting of aliphatic hydrocarbon radicals and aliphatic hydrocarbon radicals substituted by hydroxy groups and containing in 1-position the group (—R$_1$—O)$_n$—H wherein R$_1$ denotes an aliphatic hydrocarbon radical and $n$ is a whole number greater than 1.

3. Imidazolines substituted in 2-position by a radical containing from 11 to 17 carbon atoms selected from the group consisting of aliphatic hydrocarbon radicals and aliphatic hydrocarbon radicals substituted by hydroxy groups and substituted in the imino group of the nucleus by the group —(C$_2$H$_4$O)$_n$H wherein $n$ is a whole number greater than 1.

4. Imidazolines substituted in 2-position by alkyl radicals containing from 11 to 17 carbon atoms and substituted in the imino group of the nucleus by the group —(C$_2$H$_4$O)$_n$—H wherein $n$ is a whole number greater than 1.

5. Imidazolines substituted in 2-position by a radical containing from 11 to 17 carbon atoms selected from the group consisting of aliphatic hydrocarbon radicals and aliphatic hydrocarbon radicals substituted by hydroxy groups and substituted in 1-position by organic radicals containing a member of the group consisting of —N—(C$_2$H$_4$O)$_n$H;  —NH—(C$_2$H$_4$O)$_n$H and —O—(C$_2$H$_4$O)$_n$—H wherein $n$ is a whole number greater than 1.

AUGUST CHWALA.